US007509491B1

(12) United States Patent
Wainner et al.

(10) Patent No.: US 7,509,491 B1
(45) Date of Patent: Mar. 24, 2009

(54) SYSTEM AND METHOD FOR DYNAMIC SECURED GROUP COMMUNICATION

(75) Inventors: W. Scott Wainner, Potomac Falls, VA (US); James N. Guichard, Groton, MA (US); Brian E. Weis, San Jose, CA (US); David A. McGrew, Poolesville, MD (US)

(73) Assignee: Cisco Technology, Inc., San Jose, CA (US)

( * ) Notice: Subject to any disclaimer, the term of this patent is extended or adjusted under 35 U.S.C. 154(b) by 720 days.

(21) Appl. No.: 10/867,266

(22) Filed: Jun. 14, 2004

(51) Int. Cl.
*H04L 9/00* (2006.01)

(52) U.S. Cl. .................................. 713/163; 726/15
(58) Field of Classification Search ............... 713/163; 726/15
See application file for complete search history.

(56) References Cited

U.S. PATENT DOCUMENTS

| 6,038,322 | A  | 3/2000  | Harkins ..................... 380/279 |
| 6,215,878 | B1 | 4/2001  | Harkins ..................... 380/281 |
| 6,484,257 | B1 | 11/2002 | Ellis ........................ 713/153 |
| 6,590,885 | B1 | 7/2003  | Jorgensen ................... 370/338 |
| 6,611,872 | B1 | 8/2003  | McCanne .................... 709/238 |
| 6,678,828 | B1 | 1/2004  | Pham et al. ................. 713/201 |
| 6,680,922 | B1 | 1/2004  | Jorgensen ................... 370/328 |
| 6,789,118 | B1 | 9/2004  | Rao .......................... 709/225 |
| 6,798,782 | B1 | 9/2004  | Caronni et al. .............. 370/409 |
| 6,826,616 | B2 | 11/2004 | Larson et al. ............... 709/228 |
| 6,839,759 | B2 | 1/2005  | Larson et al. ............... 604/354 |
| 2002/0136223 | A1* | 9/2002 | Ho ........................ 370/395.51 |
| 2002/0188871 | A1* | 12/2002 | Noehring et al. ............ 713/201 |
| 2003/0188159 | A1* | 10/2003 | Josset et al. ................ 713/163 |

OTHER PUBLICATIONS

Frank Derfler et al, How Networks Work, Sep. 2000, Que Corporation, 188-189.*

* cited by examiner

*Primary Examiner*—Gilberto Barron, Jr.
*Assistant Examiner*—Cordelia Kane
(74) *Attorney, Agent, or Firm*—BainwoodHuang

(57) ABSTRACT

Conventional mechanisms exist for denoting such a communications group (group) and for establishing point-to-point, or unicast, secure connections between members of the communications group. In a particular arrangement, group members employ a group key operable for multicast security for unicast communication, thus avoiding establishing additional unicast keys for each communication between group members. Since the recipient of such a unicast message may not know the source, however, the use of the group key assures the recipient that the sender is a member of the same group. Accordingly, a system which enumerates a set of subranges (subnets) included in a particular group, such as a VPN, and establishing a group key corresponding to the group applies the group key to communications from the group members in the subnet. The group key is associated with the group ID by enumerating the address prefixes corresponding to each of the subnets in the group, and examining outgoing transmissions for destination addresses matching one of the address prefixes corresponding to the group.

30 Claims, 7 Drawing Sheets

SYSTEM AND METHOD FOR DYNAMIC SECURED GROUP COMMUNICATION

BACKGROUND

Virtual Private Networks (i.e., VPNs) provide a partitioning mechanism for isolating data transmitted and received between customer network nodes even though a corresponding physical network supporting propagation of the data is shared by many users. The data transmitted between such network nodes may be encrypted to protect against eavesdropping and tampering by unauthorized parties. Because the physical network is shared, costs of using resources are generally reduced for each of many users. A typical arrangement involves customer edge routers communicating via the Internet (or shared backbone) between local area networks (LANs), which the respective edge routers protect. The edge routers establish secure, encrypted links between each other to protect the trusted LANs in the VPN.

A physical network such as a service provider network topology, therefore, may include peripherally located provider edge routers, each of which couples to one or multiple customer edge routers. The customer edge routers, in turn, may couple to private local area networks associated with one or multiple customers. Typically, the service provider network selectively couples the local area networks to each other through links created between its provider edge routers.

According to one conventional technique, a service network may extend beyond provider edge nodes to customer edge nodes. For example, the connectivity model supported by RFC2547 (IETF Request For Comments 2547, as is known in the art) generally enables multiple CE (Customer Edge) nodes to establish a link between each other for transmission of data messages between corresponding interconnected networks. Copending U.S. patent application Ser. No. 10/649,755, filed Aug. 26, 2003, entitled "Method and Apparatus to Distribute Policy Information" attempts to provide the identity of peers used to establish a secure communication and provides a mechanism for distributing routing and community of interest information among such customer edge nodes, or routers.

SUMMARY

Conventional VPN environments employ customer edge (CE) routers to protect a network portion, or subnet, of the VPN. Such a subnet, for example, may be a customer site LAN interconnected with other customer site LANs collectively defining the customer VPN. Typical installations include a plurality of network subnets organized as a group, in which each of the network subnets is identifiable by a subrange of addresses included therein. Such a group, therefore, includes a set of recipients in one or more subranges denoted as belonging to the group. Often, group members wish to engage in secure communication with other group members via the VPN framework. Accordingly, it is beneficial to establish a point-to-point secure connection between CE routers serving the respective group member recipients in the group.

Use of a security protocol such as IPSec to protect traffic between two VPN subnets requires the IPSec security gateways protecting the subnets to agree on a security policy. Many elements of the security policy may be configured once in the security gateway and the elements are independent of the topology of the VPN. There are at least two security attributes that may not be known a priori and require repetitive updates to all the security gateways as the network topology changes. The two security attributes include: i) trusted subnets (i.e., IP network address and mask) protected by a peer security gateway to a particular subnet and ii) the security gateway's identity, or group ID collectively identifying each of the subnets in a particular communications group. Note further the distinction between the routers constituting a "VPN group," thus protecting a number of hosts which may join such a "multicast group," defined further below.

Conventional mechanisms exist for denoting such a communications group (group) and for establishing multicast secure connections between members of the communications group. For example, Internet RFC 3740 defines multicast groups and mechanisms for propagating messages to each of the plurality of group members. Group members receiving a group multicast from a message originator in the group, for example, employ the information in the multicast message to associate a group key supporting a secure (encrypted) connection back to the message originator. The association of a group key to a multicast group does facilitate multi-point communications; however, it does not facilitate the exchange of point-to-point unicast data streams between any two members of the group. The establishment of point-to-point protected unicast messages involves a separate key exchange to establish a pairwise key and secure connection between each pair of recipients in the group. Therefore, a separate key exchange is performed for each pair of recipients establishing a connection.

Configurations of the invention are based, in part, on the observation that substantial computational resources may be required to establish pairwise keys and corresponding connections for groupwise secure communications. While conventional group designations, such as multicast groups, facilitate such multicast messages from a message originator to other members of the group, secure unicast messages between group members typically involve separate key exchanges and secure sessions for each connection supporting unicast, or point-to-point, messages between group members. Accordingly, it would be beneficial to establish a group key identified by a group ID, or gateway ID, and applicable to communications between group members (recipients) deployed on the subnets included in the group.

Accordingly, particular configurations of the invention substantially overcome the above described shortcomings of conventional secure group communications by enumerating a set of subranges (subnets) included in a particular group, and establishing a group key corresponding to the group members. The group ID associates with (corresponds to) each of the sets of subranges, and therefore collectively identifies each subnet range, such as an address prefix, of each of the subnets in the group. While typical multicast communications employ a group key, conventional unicast employ a pair-wise key. Configurations discussed herein employ a group key model from multicast security for unicast, or point-to-point communications. In multicast, the recipients are not known; therefore, the sender must use a group key. In our unicast model, a corollary paradigm exists where the recipient of a unicast may not know the source; however, the use of the group key assures the recipient that the sender is a member of the same group.

The use of the group ID provides elimination of pair-wise keying for unicast transmissions. In the exemplary configuration discussed herein, a particular methodology (e.g. IPSec tunnel mode with IP header preservation) facilitates a common security method to apply to both unicast and multicast transmissions. In either case, the protected destination prefixes (i.e. unicast prefix or multicast group) may be propagated with the associated group ID in order to facilitate secure group communication to the destination prefix. On receipt, a marking in the packet (e.g. the Security Parameter Index (SPI) in the IPSec tunnel header) may be used to identify encrypted data and the associated group security association. The receiving router may then verify the destination of the transmission is associated with this group.

Individual VPN devices, such as routers protecting a particular subnet, use group member credentials to authenticate with a key management server for obtaining the appropriate group keys. The security router protecting the trusted subnet obtains the group key, and is operable to apply the group key to group communications with the group members where communication is established from the protected subnet for which the security router is responsible. Group members are identifiable by matching the subnet range of each of the subnets (ranges) in the group. In this manner, the group key is associated with the group ID by enumerating the address prefixes corresponding to each of the subnets in the group, and examining outgoing transmissions for destination addresses matching one of the address prefixes corresponding to the group.

In further detail, the method of secure communications within a group includes identifying a plurality of potential recipients as members of a group, in which the group is denoted by a group identifier. A group member, such as a customer edge router, receives security credentials for the group corresponding to the group identifier, and associates the received security credentials with the group identifier (ID) indicative of potential recipients in the group. The association is referenced, such as in a routing lookup, for employing the security credentials via the group identifier for a communication from a member of the group to at least one other member of the group.

The receipt of the security credentials further includes establishing, at a key management server, a group key for the group associated with the group identifier, and transmitting the resulting security credentials including the group key to the other group members (routers) to enable groupwise usage of the group key by each of the edge routers in the group. The routers receive the security credentials via a unicast or multicast group prefix announcement, in which the announcement is operable for receipt by each member of the group and includes the group ID indicative of the members of the group, optionally the address of a key server having the group key and optionally an authentication method to be employed with respect to the key.

Each of the routers in the group employs the security credentials when communicating with the key management server identified in the group prefix announcement and to authenticate themselves with the key management server and the group ID. The authenticated router then receives the key corresponding to the group ID from the key management server. Each of the routers further includes group routing information in a routing table. The group routing information is operable for identifying the subset of the group denoted by a group prefix indicative of an address subrange denoting group members, and for propagating the group prefix and the group ID to other group members. Each of the other group members corresponds to one of the other group prefixes, indicative of an address subrange denoting group members, to provide consistent routing information among the routers. Each of the routers may therefore identify a communication as destined for another group member, and employing the key corresponding to the group for the communication to the other group member.

In particular configurations, the group key corresponding to the group security credentials is operable to transform packets by delivering an encrypted payload to either a single member or a plurality of group members via the key, without reencrypting the payload.

In an IP arrangement, the group is typically a logical group operable to include group members according to an external protocol, in which communication between group members further employs consistent routing information between group members. The use of consistent routing information (i.e. routing table) allows the delivery of group security identities to enable group members to receive the same group key, therefore avoiding reestablishment of a trusted connection for successive communications between different group members. Further, the group further includes a plurality of address subranges, each address subrange indicative of at least one recipient.

Therefore, the group key provides secure communication from a group member to a plurality of other group members employing the same security credentials and avoiding establishing a point-to-point key from the group member to each of the plurality of other (recipient) group members. In a particular configuration, the communication employs a tunnel mode with IP header preservation to enable routing information to remain visible in a manner nonintrusive to the encrypted payload. Such communications attributes further allow authentication assurances by comparison of inner and outer header upon decryption and/or delivery.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM or RAM or PROM chips, field programmable gate arrays (FPGAs) or as an Application Specific Integrated Circuit (ASIC). The software or firmware or other such configurations can be installed onto the computerized device (e.g., during operating system for execution environment installation) to cause the computerized device to perform the techniques explained herein as embodiments of the invention.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
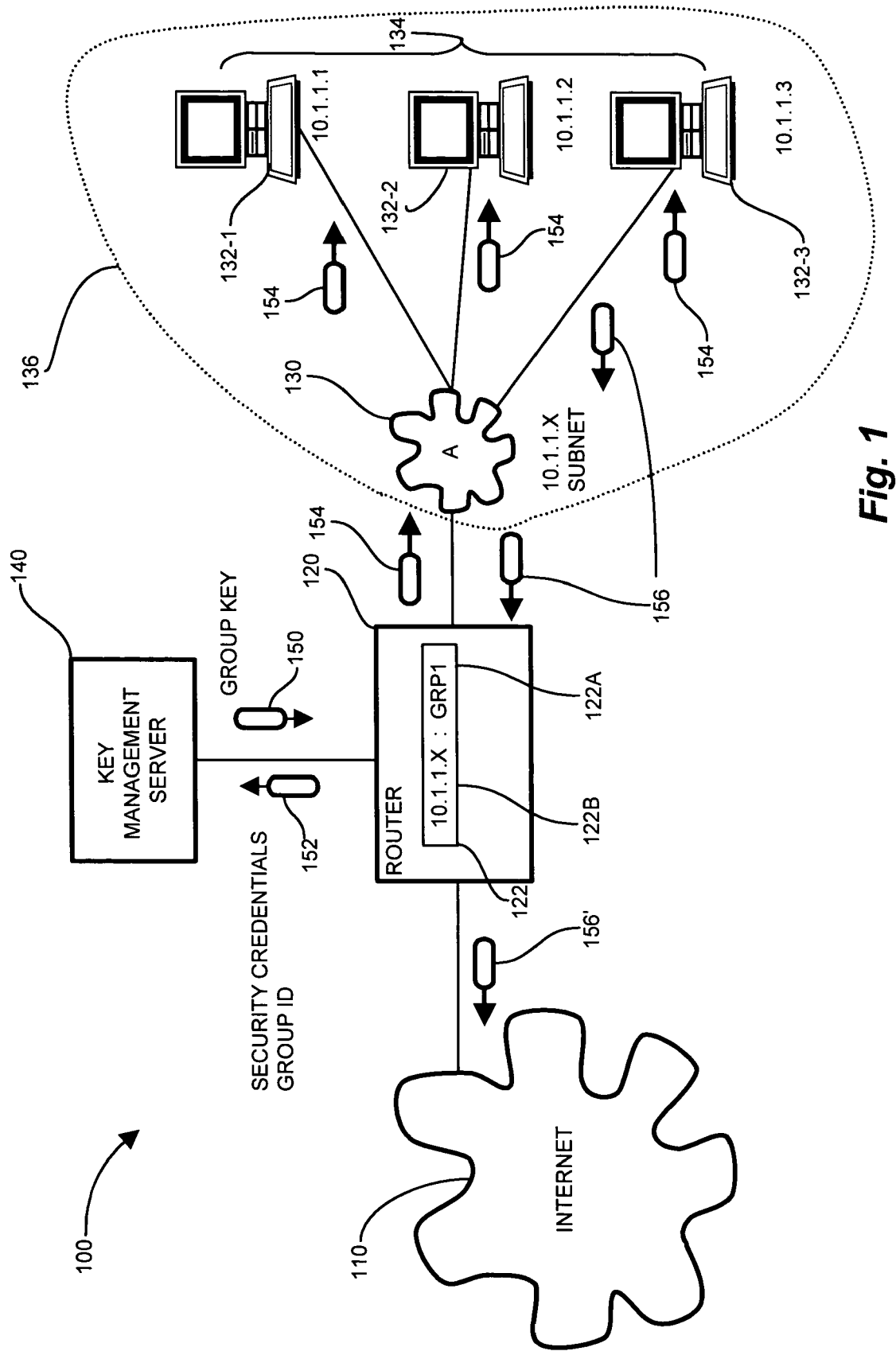
FIG. 1 is a context diagram of a communications environment operable for use with the present invention.

A VPN interconnects a plurality of edge routers for transporting secure communications between members of the group behind the edge routers. Conventional IPSec VPN implementations define a point to point unicast secure connection between members of the communications group. In contrast, multicast group members receiving a group multicast from a message originator in the group, for example, employ the information in the multicast message to establish an additional group key supporting a secure (encrypted) connection back to the message originator. Point-to-point encryption paradigms for unicast typically do not scale well when associating a large number of members in the group, while typical group encryption paradigms for multicast do not accommodate unicast. Described in further detail below is 1) a method for these two paradigms to be combined into a common security group for both multicast and unicast communication and 2) a method for distributing the necessary information to associate trusted subnets (both unicast prefixes and multicast addresses) with that group.

Configurations of the invention are based in part, on the observation that substantial computational resources may be required to establish such pairwise keys and corresponding connections for groupwise secure communications. While conventional group designations, such as multicast groups, facilitate multicast messages from a message originator to other members of the group, secure unicast messages between group members typically involve separate key exchanges and secure sessions for each connection supporting the unicast, or point-to-point, messages between group members. Secure communication between group members is facilitated by a group key identified by a group ID, or gateway ID, and is applicable to communications between group members (recipients) deployed on the subnets included in the group.

Conventional techniques employ a separate pairwise point-to-point key associated with the Gateway ID for secure communications between group members. Accordingly, a key exchange occurs between each point-to-point connection in order to establish the pairwise key for the communication between particular group members. The group key, corresponding to the Group ID, or gateway, avoids a plurality of unicast (pairwise) keys and is applicable to communications based on the subnet range, such as an address prefix, matching the subnets in the group.

In the particular configuration discussed herein, the group IDs identify gateway, or customer edge routers, which are devices operable to protect a particular subnet of recipients, identified by a subnet prefix. The subnet prefix identifies the subrange of addresses owned by the recipients in the subnet. A particular VPN, therefore, includes subnets corresponding to one or more of the gateway routers. Group members, therefore, collectively include the recipients in the set of address subranges of the group. Since an outgoing communication emanates from within the subnet protected by the gateway router, the communication is known to emanate from the gateway router corresponding to the group. The gateway router identifies an outgoing communication as belonging to a group when the recipient of such a communication is within one of the address prefixes, or subranges, of the group. The gateway router then employs the group key corresponding to the group ID for encrypting the communication before sending the communication to the remote gateway router protecting the recipient subnet.

FIG. 1 is a context diagram of a communications environment 100 operable for use with the present invention. Referring to FIG. 1, the communications environment 100 includes a public access network 110 such as the Internet, and at least one switching device such as a router 120. The router 120, which may be a customer edge (CE) router discussed further below, is operable to control access to a subnet 130 including a plurality of recipients 132-1 . . . 132-3 (132-N, generally) denoting a subnet range 134. The router 120 includes security information such as associations 122, indicative of group Ids 122A and corresponding address subranges (address prefixes) 122B, and may represent a single destination path to the recipients 132-N, or may be one of a plurality of paths. Similarly, the router 120 may support only the subnet range 134, or may support other recipients 132-N not in the subrange, and hence, not included in a group 136 corresponding to the subrange 134. The exemplary group 136 illustrates recipients 132-1.132-3 in the subnet 130, however multiple subnets 130, each corresponding to a particular subrange 134 are illustrated below. Further, the router 120 is in communication with a key management server 140 operable to provide security services such as authentication and group encryption keys 150 (group key) in response to security credentials 152.

Figure 2:
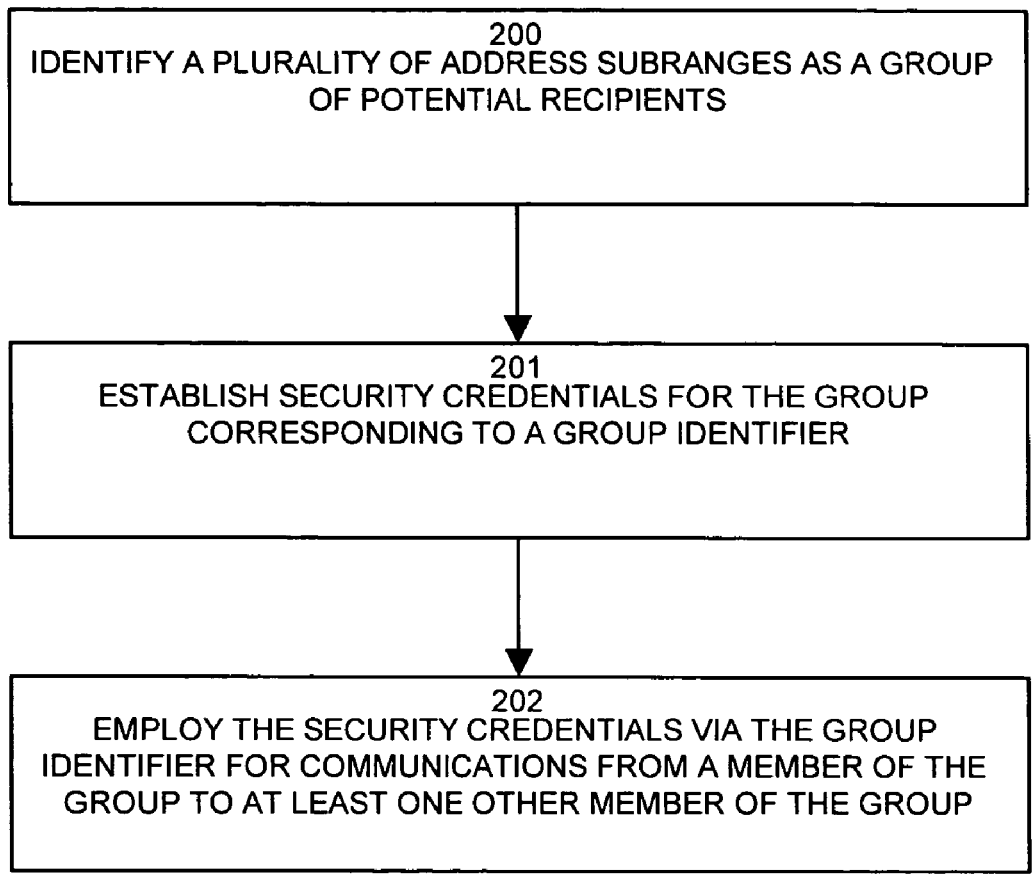
FIG. 2 is a flowchart depicting the operation of an exemplary configuration of the present invention in the context of FIG. 1.

FIG. 2 is a flowchart depicting the operation of the present invention in the context of FIG. 1. Referring to FIGS. 1 and 2, the method of secure communications, in the particular exemplary configuration disclosed herein, includes identifying a plurality of address subranges 134 as a group 136 of potential recipients 132-N, as depicted at step 200. In a typical arrangement, one or more subnetworks 130 define the group 136, and accordingly, the group 136 includes each of the individual recipient computer systems 132-N (recipients) in each of the subnetworks 130. A particular address range 134, such as a subset of an IP address 10.1.1.1 through 10.1.1.3, denotes the subrange for each of the subnetworks 130. In the exemplary configuration, such a subrange corresponds to a subnet address prefix, e.g. 10.1.1.X, or simply address prefix, notable because the prefix is common to each recipient 132-N address in the subnetwork (subnet) 130.

The router 120 establishes security credentials 152 for the group 136 corresponding to a group identifier 122A by identifying a group identifier, a responsive key management server 140, and an authentication mechanism operable for use by routers 120 in the group, as depicted at step 201 of FIG. 2. The router 120 sends the security credentials 152 to the key management server 140 for obtaining the group key 150. The key management server 140 establishes a group key 150 corresponding to the group 136 by any suitable mechanism, such as Internet RFC 3547 (not specifically shown). Once the key management server 140 establishes the group key 150 corresponding to the security credentials 152, the security credentials 152 will be sent to router 120 to indicate membership in the group and the group ID 122A.

The subnet routers 120 then employ the security credentials 152 via the group identifier 122A for communications from a member of the group 132-N to at least one other member of the group 132-N, as depicted at step 202 of FIG. 2. Following establishment of the group key 150 in step 201, each of the subnet routers 120 has or may obtain the group key 150 using the disseminated security credentials 152. Since the security credentials 152 identify authentication mechanisms, a separate authentication process occurs for each router 120 receiving the group key 150. The individual recipients 132-N may then receive unicast, or point-to-point, transmissions from other group 136 members (note that the illustrated subnet 130 and corresponding subrange association 122 typically encompasses multiple subnets 130, as shown below in FIG. 3).

Figure 3:
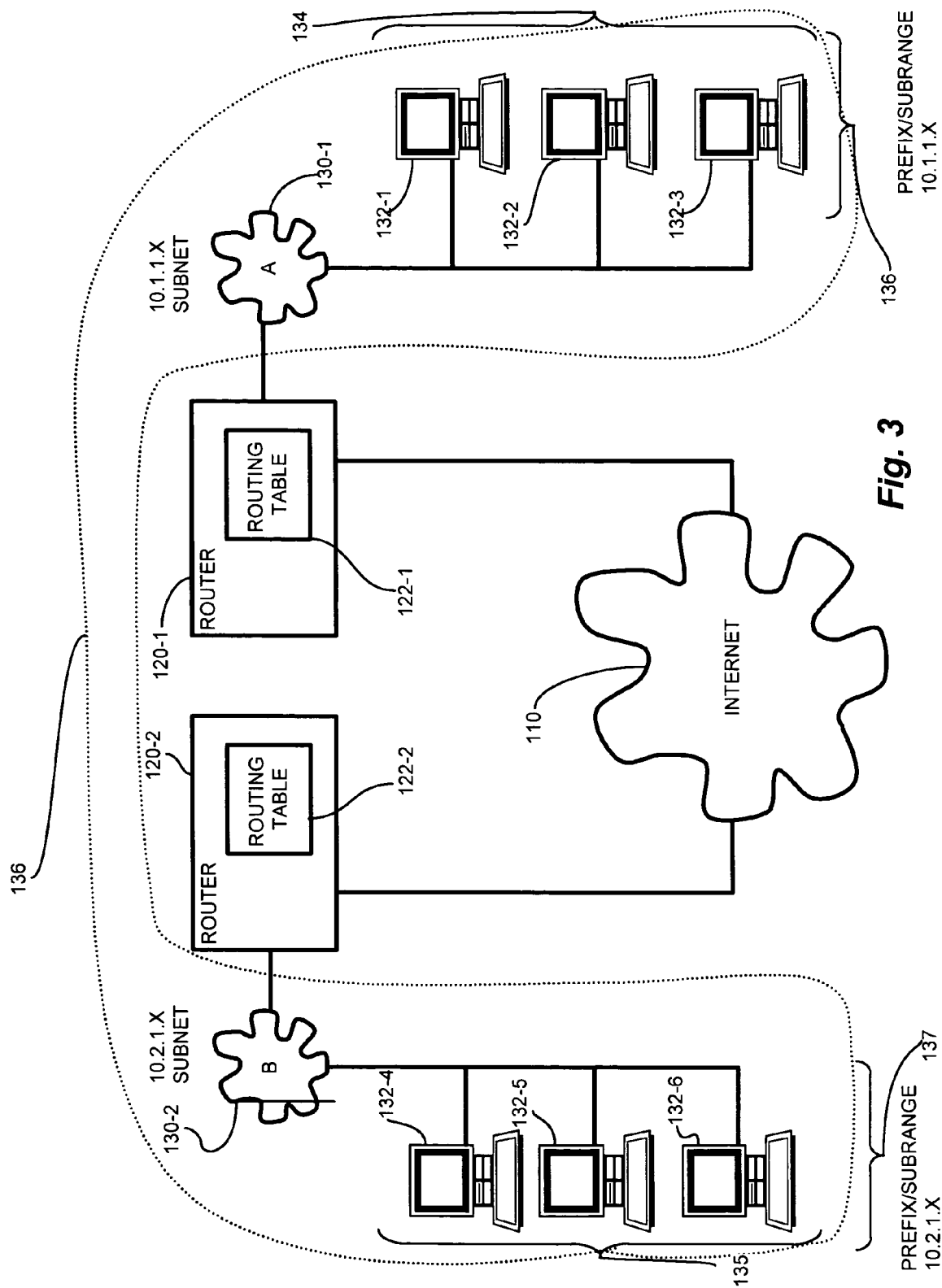
FIG. 3 is a block diagram of a VPN (Virtual Private Network) configuration employing arrangements of the invention.

Referring to FIG. 3, discussed further below, when the router 120 identifies an outgoing transmission from the subnet 130 addressed to a subrange in the group 136 as identified in the security associations 122, the router 120 employs the group key 150 to encrypt the outgoing transmission 156'. Accordingly, the router 120-1 associates the subnet 130-1 with Group ID 122A. The routing element and associated security element 122 is propagated to other group members via a routing protocol. As such, the router 120-1 expects incoming transmissions destined to subnet 130-1 to be encrypted with the group key 150. All other routers such as 120-2 do the same. As such, router 120-1 will receive routing update 130-2 for subnet 10.2.1.X with the associated Group ID 122A. Router 120-1 will subsequently send any transmission from subnet 130-1 using the group key 150 such that communication 156' is created and routed to router 120-2.

FIG. 3 is a block diagram of a VPN (Virtual Private Network) configuration suitable for use with arrangements of the invention. Referring to FIG. 3, a plurality of exemplary routers 120-1, 120-2 connect to the public access network 110, each serving a respective subnet 130-1, 130-2. As can be seen in FIG. 3, subnet A 130-1 corresponds to prefix 10.1.1, for the subrange 10.1.1.1 through 10.1.1.3 of recipients 132-1 . . . 132-3. Similarly, subnet B 130-2 corresponds to prefix 10.2.1, for the subrange 10.2.1.4 through 10.2.1.6 of recipients 132-4 . . . 132-6, all collectively forming the group 136. Further, each subnet 130-1, 130-2 is served and protected by a router 120-1, 120-2, respectively, each having a routing table 122-1,122-2. Ideally, the routing tables 122-1,122-2 include the same routing information 122, subject to insubstantial propagation delays, discussed further below.

Employing the system disclosed in FIGS. 1 and 3, in an exemplary configuration, a recipient 132-1 on subnet A 130-1 is operable to send a transmission (message) to a recipient 132-6, because each subnet 130-1 and 130-2 is a member of the group GRP1 and served by the respective router 120-1, 120-2 having the group routing information 122 in the routing table 122-1, 122-2. The routing tables 122-1, 122-2 are discussed further below with respect to Table I. When the message sent by recipient 132-1 reaches router 120-1, router 120-1 encrypts it with the group key 150 and forwards it to router 120-2. Router 120-2 decrypts it with the group key 150 and forwards the message on to recipient 132-6.

Figure 4:
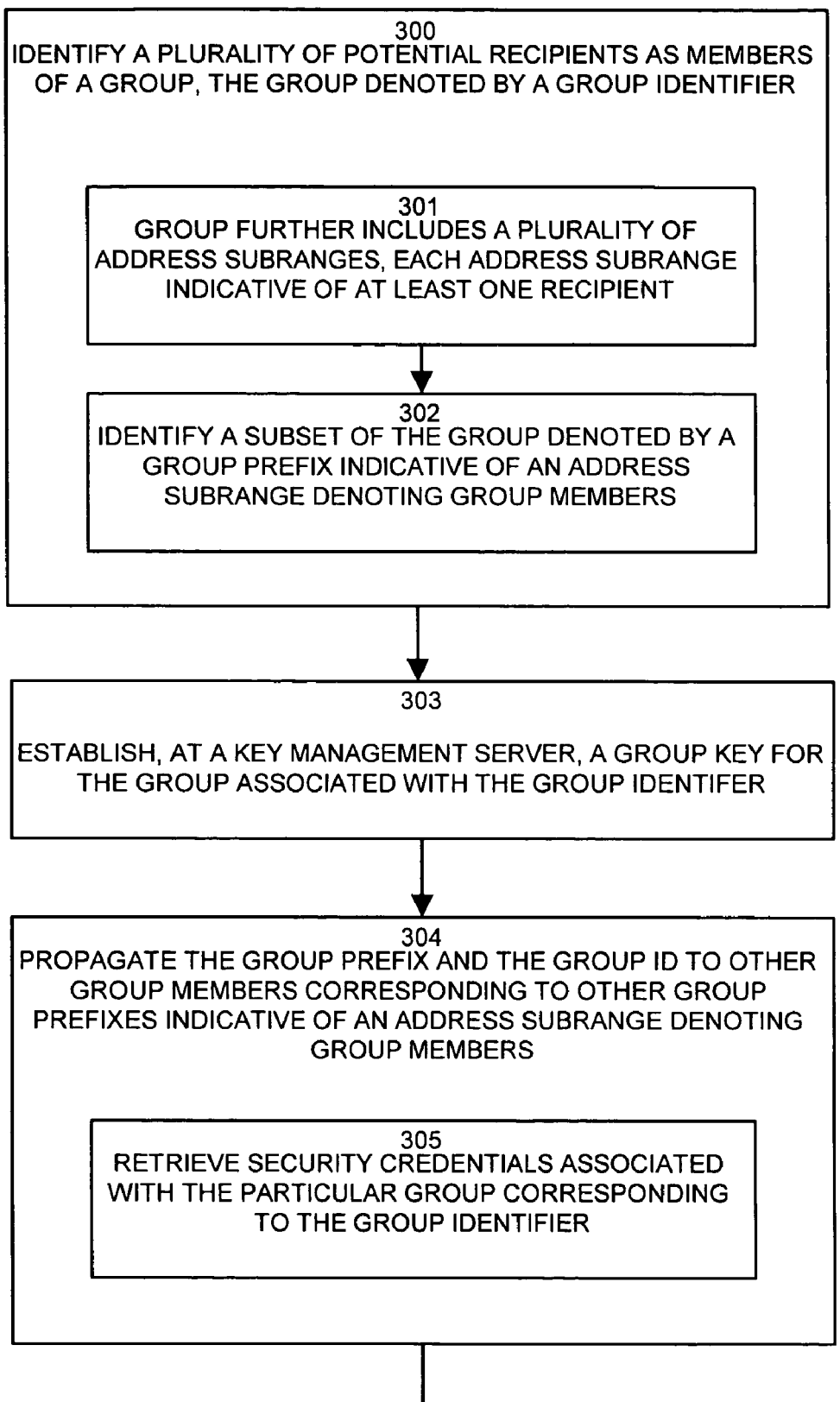
FIGS. 4-5 are a flowchart of defining and establishing a multicast group key according to the exemplary configuration of FIG. 3.
Figure 5:
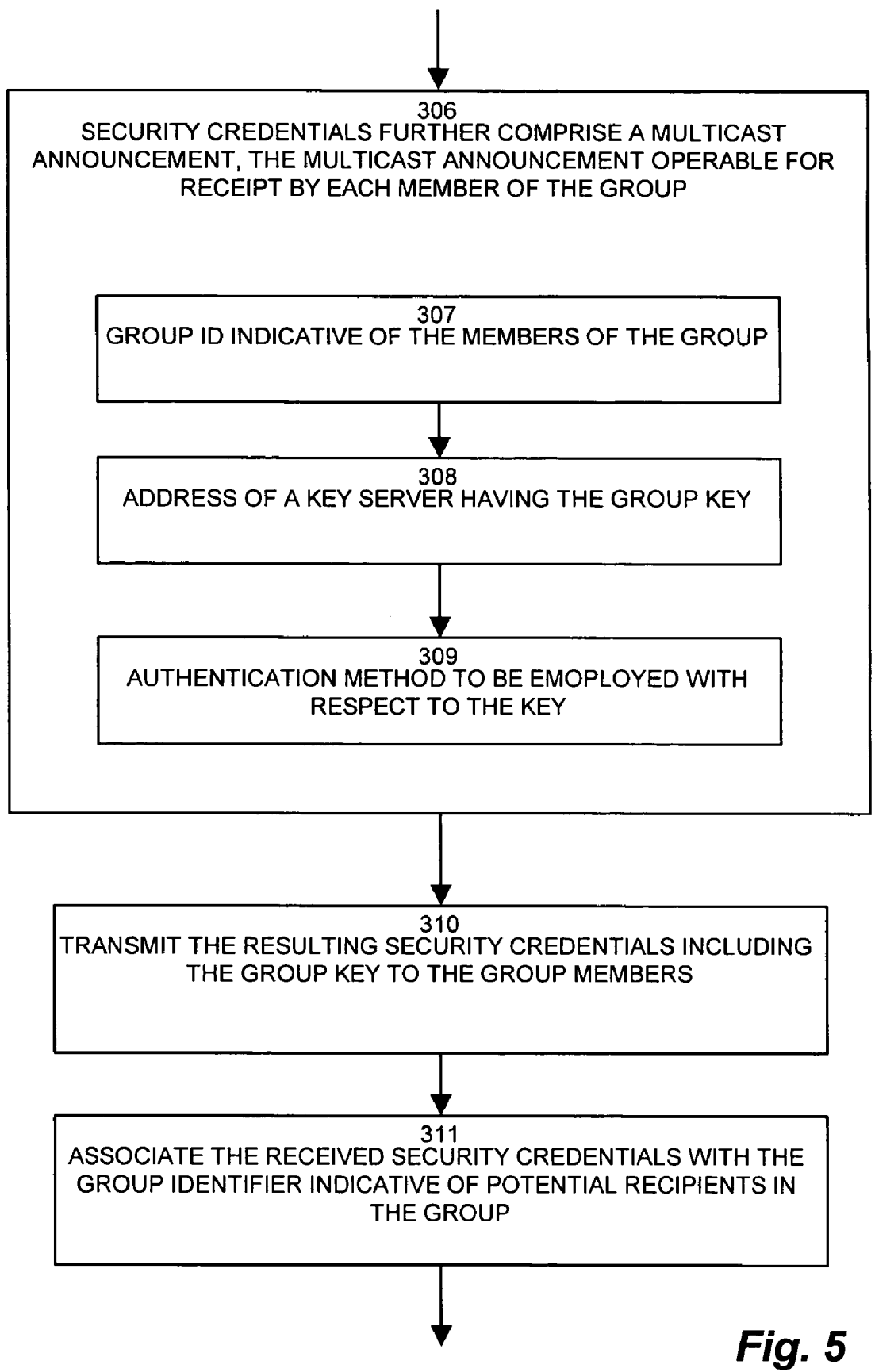

FIGS. 4-5 are a flowchart of defining and establishing a multicast group key according to the exemplary configuration of FIG. 3. Referring to FIGS. 1 and 3-5, a group initiator, which may be any of the routers 120-N serving a subnet 130-N, identifies a plurality of potential recipients 132-1 . . . 132-6 as members of a group 136, in which the group 136 is denoted by a group identifier 122A (i.e. GRP1), as depicted at step 300. In the exemplary arrangement illustrated in FIG. 3, the group 136 further includes a plurality of address subranges, specifically 10.1.1.1 through 10.1.1.3 (132-1 . . . 132-3) defining subnet 130-1 and 10.2.1.4 through 10.2.1.6 (132-4 . . . 132-6) defining subnet 130-2, as shown at step 301. Further, each address subrange is indicative of at least one recipient (client) 132-N. Each subnet 130-1, 130-2 is identifiable as a subset of the group 136 by a group prefix 122B indicative of the address subrange denoting group members, such as 10.1.1.X and 10.2.1X, as depicted at step 302. Note that the address ranges discussed are exemplary, and simplified for illustrative purposes. An actual multicast protocol typically requires certain predetermined IP address values for proper operation, and that in the protocol cited above, the multicast address range is significantly different. In addition, the subnets 130-1 and 130-2 are not themselves members of the multicast address range. Multicast requires potential recipients (hosts) such as 132-N to join the multicast address range. Router 120-1 and router 120-2 must have defined the multicast address as an address in the protected range of addresses by GRP1 identified by 122A. Routers 120-1 and 120-2 would authenticate with 140 such that the group key 150 is used for encryption of multicast frames from any source transmitting to the security group 136.

Following identification of the group 136 members, one of the routers 120-N establishes, at the key management server 140, the group key 150 for the group 136 associated with the group identifier GRP1. The establishing router 120-1 propagates the corresponding group prefix (10.1.1.X and 10.2.1X) and the group ID GRP 1 to other group members (routers) 120-N corresponding to other group prefixes 122B (10.1.1.X or 10.2.1X) indicative of the address subranges denoting group members 132-N as shown in step 304. The propagating router 120-1, in this example, retrieves the security credentials 152 associated with the particular group 136, as depicted at step 305.

Typically the group prefix 122B takes the form of a unicast or multicast group prefix announcement 154 including the security credentials 152 for the group 136 corresponding to the group identifier 122A GRP1. The announcement 154 is operable for receipt by each member (routers) 120-N of the group 136 and propagates among routers 120-N serving the group so as to disseminate the group routing information 122 and coordinate each of the routing tables 122-1,122-2 of the group 136. In this manner, each of the routing tables 122-N has similar routing information, subject to a small propagation delay, such that group 136 communications are recognizable from the routing prefix.

Specifically, the security credentials 152 enable member routers 120-N to obtain the group key 150 for each recipient 132-N in the subnet 130-N, and thereby avoid a key exchange whenever an intergroup message is sent. The security credentials 152 in the announcement 154, therefore include the group ID 122A indicative of the members of the group, as shown at step 307, e.g. GRP 1, optionally the address of a key server 140 having the group key 150, as depicted at step 308, and optionally an authentication method to be employed with respect to the key 150, as disclosed at step 309. As indicated above, the group ID itself is not security sensitive, but rather an indication to member routers 120 toward obtaining the group key 150 via proper authentication methods enabled by the security credentials 152. Group 136 routers 120-N need only obtain the group key 150 from a key exchange 152 with the key management server 140, and may then provide VPN services to any recipients 130-N in the subnet 130-N via the group key 150.

TABLE I

| SUBNET (VPN) | GROUP ID (VPN ID) | KEY MGT SERVER | PREFIX |
|---|---|---|---|
| A | GRP1 | 140 | 10.1.1.X |
| B | GRP1 | 140 | 10.2.1.X |
| ... | ... | ... | ... |

After the key management server 140 transmits the resulting group key 150 to the group member (routers) 120, as depicted at step 310, the router 120-N associates the received security credentials 152 with the group identifier GRP1 indicative of potential recipients 132 in the group 136, as shown at step 311. The association 122, codified as a set of associations in the routing table 122-N, enumerates a list of group prefixes 122B corresponding to subnets 130-N, which are operable to determining intergroup communications, shown in Table I.

Figure 6:
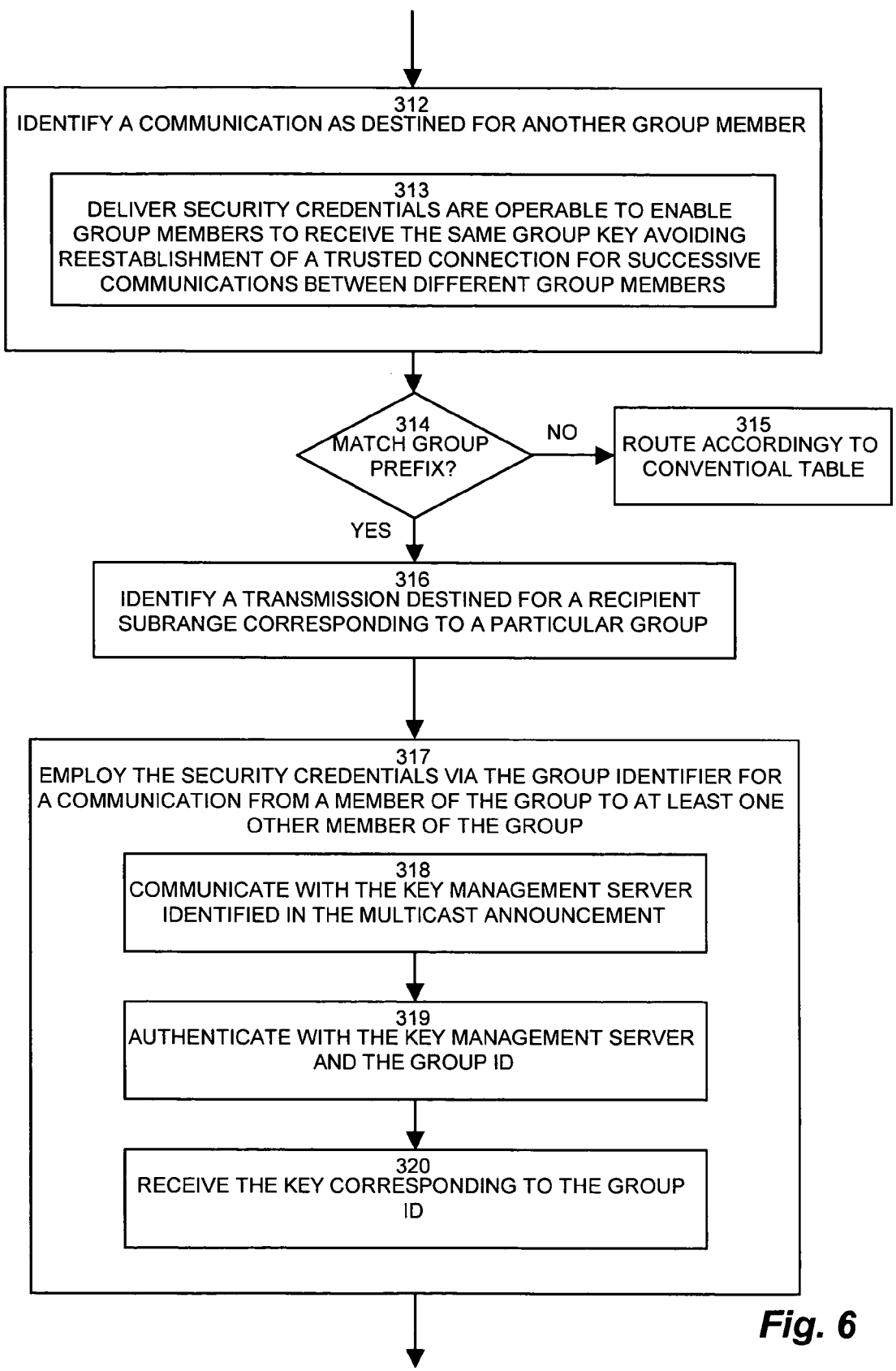
FIGS. 6-7 are a flowchart of employing a group key for unicast communications according to the exemplary configuration of FIG. 3.
Figure 7:
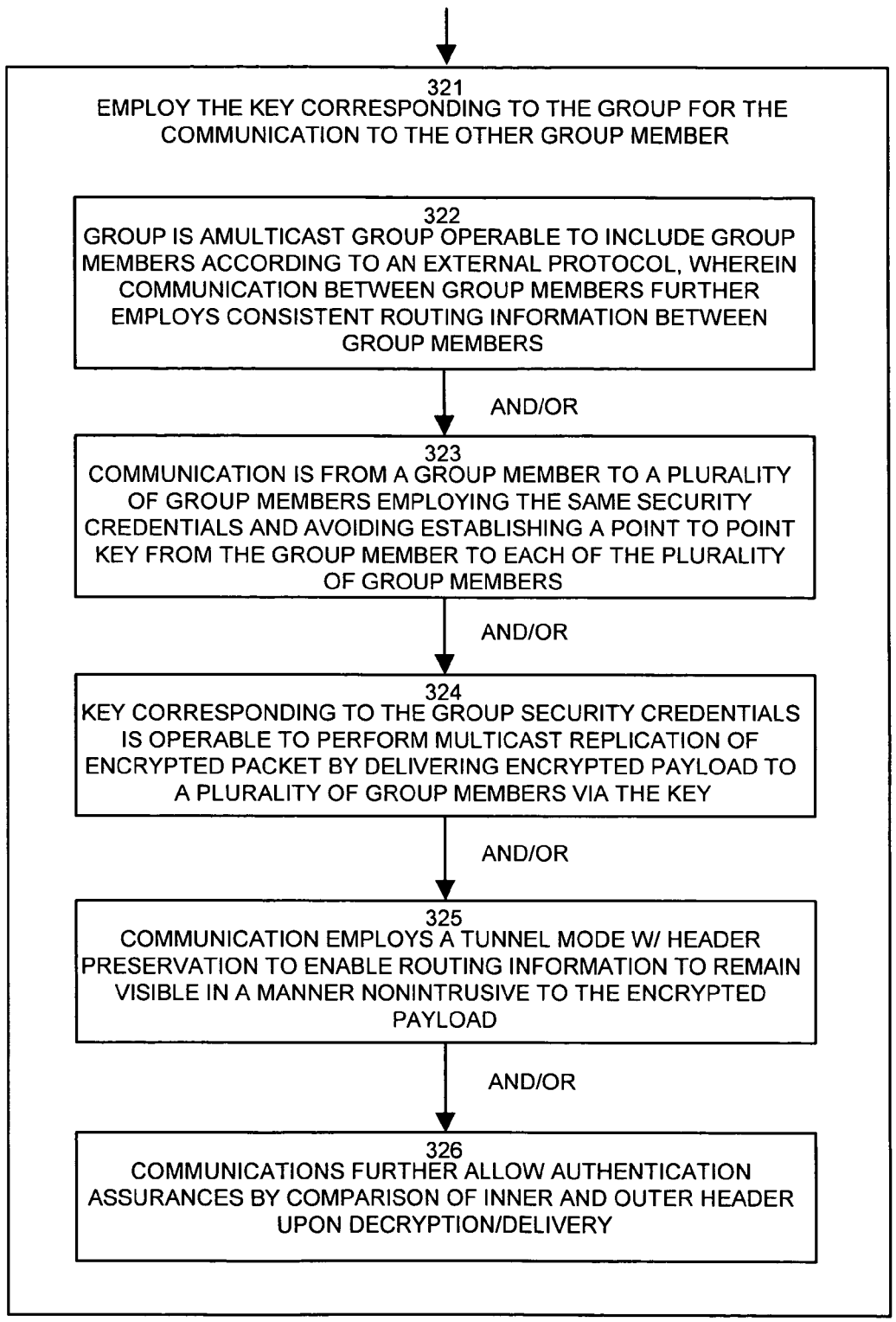

FIGS. 6-7 are a flowchart of employing the group key for communications according to the exemplary configuration of FIG. 3. The sequence described in FIGS. 4 and 5 corresponds primarily to group identification and establishment to identify member subnets 130-N and corresponding routers 120-N, and to enable and/or disseminate the actual group key 150 to the individual routers 120-N serving recipients 132-N in each of the respective subnets 130-N of the group. FIGS. 6 and 7, discussed below, correspond primarily to employing the group key 150 for intergroup communication between recipients 132-N disposed in different subnets 130-N of the group 136.

Accordingly, the router 120-2 attempts to identify a communication as destined for another group member 132-N, as depicted at step 312 (recall that router 120-1, acting as the group initiator, has already received the actual group key 150). The previously delivered security credentials 152 are operable to enable group members, such as router 120-2, to receive the same group key 150 to avoid reestablishment of a trusted connection for successive communications between different group members 120-N, as depicted at step 313. The router 120 performs a check to determine if the destination recipient 132-N of the communication matches a group prefix 122B in the routing table 122-2, as depicted at step 314. Typically, routers 120 frequently perform routing operations by matching entries in a routing table 122-N, however, alternate forms of routing may be performed by certain high-end routing protocols and or mechanisms, such as via caching, hashing and queuing.

If the match for a group recipient 132-N does not indicate an intergroup communication, then the routing operation continues according to conventional routing mechanisms and the group key 150 is not employed, as depicted at step 315. If a match is found, however, the router 120-N identifies the transmission as destined for a recipient subrange corresponding to a particular group 136 by indexing the group corresponding to the matching subrange entry, as depicted at step 316. A particular group GRP1 typically corresponds to multiple entries in the routing table 122-N to correspond to the subranges in the group. Similarly, there may be multiple groups identified by subranges in the routing table.

The router 120-N then employs the security credentials 152 via the group identifier 122A for a communication from a member of the group to at least one other member of the group 136, as depicted at step 317. Since, in this exemplary configuration, the router 120-2 has received the credentials 152 but has not yet encountered a need to obtain the group key, the router 120-2 communicates with the key management server 140 identified in the group prefix announcement 152 to obtain the group key 150, as depicted at step 318. The router 120-2 authenticates itself with the key management server 140 and the group ID 122A, as shown at step 319, and receives the group key 150 corresponding to the group ID GRP1 from the security credentials 152, as depicted at step 320. The router 120-2 may now employ the group key 150 for successive intergroup communication, as determinable from matches on the group prefixes 122B in the routing table 120-2 and Table I, and need not perform the key and authentication exchange in order to employ the group key 150 for subsequent unicast or multicast group communications.

Therefore, the router 120-2 employs the key 150 corresponding to the group 136 for the communication to the other group member 132-N, as depicted at step 321. In the example shown, the communication recipient is at least one of 132-1, 132-2 and 132-3, corresponding to group members in the subnet 130-1 different from the subnet 130-2 served by the sending router 120-2. Note that the prefix matching and routing mechanism described herein is operable within a subnet 130-2 served by a particular router 120-N, however there is likely little need to encrypt such a communication if the subnet 130-2 is trusted.

Accordingly, the communication to the recipient group member 132-N, in the exemplary configuration shown, occurs as above wherein the group 136 is a multicast group operable to include group members 132-N according to an external protocol such as the IETF IP multicast protocol, wherein communication between group members further employs consistent routing information between group members 132-N, thereby allowing consistency between the routing tables 122-1, 122-2, as depicted at step 322.

Taking a perspective of a typical VPN in which multiple subranges, or subnets, each supporting a particular client group 130-1, 130-2, perform intragroup communications between subnets, unicast communication as defined herein occurs between clients 132-N of different subgroups. As described above, the communications system 100 is configured to provide secure communications between multiple clients 132 belonging to a first client group 134 and multiple clients 132 belonging to a second client group 135 (also see FIGS. 1 and 3). Such communications utilize a key 150 associated with the first and second client groups 134. In particular, a first router 120-1 (FIG. 3) of the system 100 is configured to receive a first transmission (e.g., one or more IP packets from a client 132 of the group 134) having a source identifier (e.g., a network source address), a destination identifier (e.g., a network destination address), and data. The first router 120-1 is further configured to generate an encryption enable result having a first value (e.g., an enable encryption value) when the source identifier identifies the first client group 134 and the destination identifier identifies the second client group 135, and a second value (e.g., a disable encryption value) when either the source identifier does not identify the first client group 134 or the destination identifier does not identify the second client group 135. Stated alternatively, the group key is employed when the source identifier and destination identifier (e.g. IP address) are both within subranges in the group. The first router 120-1 is further configured to output a second transmission having the source identifier, the destination identifier, and the data thus propagating the communications through the network. The data of the second transmission is in an encrypted form based on the key 150 associated with the first and second client groups 134, 135 when the encryption enable result has the first value. On the other hand, the data of the second transmission is not in an encrypted form based on the key 150 when the encryption enable result has the second value.

Similarly, a second router 120-2 (FIG. 3) is configured to receive the second transmission from the first router 120-1 and generate a decryption enable result having a first value (e.g., an enable decryption value) when the source identifier identifies the first client group 134 and the destination identifier identifies the second client group 135, and a second value (e.g., a disable decryption value) when either the source identifier does not identify the first client group 134 or the destination identifier does not identify the second client group 135. The second router is further configured to output a third transmission having the source identifier, the destination identifier, and the data. The data of the third transmission is in a decrypted form based on the key 150 when the decryption enable result has the first value, not being in a decrypted form based on the key 150 when the decryption enable result has the second value.

As further described above, a key management server 140 is configured to provide the key 150 to the routers 120. In particular, the key management server 140 sends the key 150 to the first router 120-1 in response to a first authentication operation authenticating the first router 120-1. Similarly, the key management server 140 sends the key 150 to the second router 120-2 in response to a second authentication operation authenticating the second router 120-2.

As indicated above, it may be beneficial to note the distinction between multicast or unicast. Both use the same key material; however, the binding of the key material to address ranges is different. Protection of unicast may be identified by the source and destination address ranges while multicast protection is identified by the multicast group address which has no permanent association with any of the routers. In the arrangement discussed above, the usage of the already established group key, rather than a separate pairwise key, for unicast or point-to-point communication, avoids the need to establish such a pairwise key by allowing the recipient to be readily be verified as a member of a trusted group by virtue of the group ID. Multicast encryption need not employ pairwise keys between group members. The only time multicast uses pairwise keys is when the multicast is encapsulated in a unicast tunnel such that IPSec can be applied. In this case, IPSec forces the use of pairwise keys between the routers supporting the recipients of the multicast flows.

It should be understood that the use of such a key 150 between client groups 134 and 135 alleviates the need to use individual or separate pairwise keys to encrypt and decrypt communications among the clients 132. As a result, the complexity and overhead for certain types of secure communications (e.g., multicast) is achievable in a simple and straightforward manner. Moreover, such secure communications easily scales by simply including more client subgroups such as 134, 135 to the group 136 thus alleviating the need for more keys as in a conventional pairwise key approach. Aspects of the configuration above are not only the simplicity of scale when adding clients (hosts) within a subgroup. Such scaling may be accommodated with modern pairwise keying paradigms between routers 120 where the address range 130 is protecting all the clients 132. The configuration above focuses on the scalability of adding subgroups like 134 and 135 without requiring the commensurate addition of pairwise keying between all routers in the set of 120. In terms of computational complexity, the above disclosed configuration scales O(n) for each subgroup N added whereas existing practices scale on the order of $O(n^2)$. In other words, computational resources for conventional pairwise keying increases exponentially with the number of recipients, while the use of the group key discussed herein increases only linearly.

In the typical arrangement employing the configuration disclosed above, the communication is from a group member to either one or a plurality of group members employing the same security credentials 152, and hence, the same group key 150, and therefore avoiding establishing a point-to-point key from the group member to each of the plurality of group members, as shown at step 323. Further, more generally, the group key 150 is operable for multicast or unicast communication between group members.

The above described pairwise key typically triggers a separate key exchange because, in a conventional public key encryption system, encrypted payload may not be duplicated to a different recipient because a different key is utilized. By employing the group key 150, the key corresponding to the group security credentials is operable to perform multicast replication of encrypted packet by delivering encrypted payload to a plurality of group members via the group key, as depicted at step 324.

In further detail, in the exemplary configuration, the IPSec security mechanism integrated with the IP protocol is employed. In the exemplary configuration, IPSec tunnels or encapsulates the encrypted data as a payload of another packet, but uses the sender and recipient address information from the payload as the sender and recipient of the encapsulating IP packet. Accordingly, such a communication employs a tunnel mode with IP header preservation via the IPSec protocol to enable routing information to remain visible in a manner nonintrusive to the encrypted payload, as depicted at step 325. This protocol and setting avoids encrypting the address information (sender and recipient), and therefore allows the subnet router 120-N to examine the address information for determining applicability of the group key. Conventional approaches may encrypt or otherwise obfuscate the address information, complicating examination of message packets for inclusion in the group 136. Such a communication mode further allows authentication assurances by comparison of inner and outer header upon decryption/delivery, since the address information is preserved in two places by the IP header preservation mode, as depicted at step 326. The recipient group router 120-N may therefore perform additional authentication of group communications by comparing the originator and recipient 132-N, as attempts to modify the outer header (unencrypted) to match a group prefix 122B would be likely to fail the match of the inner recipient 132-N information.

Those skilled in the art should readily appreciate that the programs and methods for secure group communications as defined herein are deliverable to a processing device in many forms, including but not limited to a) information permanently stored on non-writeable storage media such as ROM devices, b) information alterably stored on writeable storage media such as floppy disks, magnetic tapes, CDs, RAM devices, and other magnetic and optical media, or c) information conveyed to a computer through communication media, for example using baseband signaling or broadband signaling techniques, as in an electronic network such as the Internet or telephone modem lines. The operations and methods may be implemented in a software executable object or as a set of instructions embedded in a carrier wave. Alternatively, the operations and methods disclosed herein may be embodied in whole or in part using hardware components, such as Application Specific Integrated Circuits (ASICs), state machines, controllers or other hardware components or devices, or a combination of hardware, software, and firmware components.

While the system and method for secure group communications has been particularly shown and described with references to embodiments thereof, it will be understood by those skilled in the art that various changes in form and details may be made therein without departing from the scope of the invention encompassed by the appended claims. Accordingly, the present invention is not intended to be limited except by the following claims.

What is claimed is:

1. A method of secure communications within a group comprising:
   identifying a plurality of potential recipients as members of a group, the group denoted by a group identifier (ID);
   receiving security credentials for the group corresponding to the group identifier;
   associating the received security credentials with the group identifier indicative of potential recipients in the group; and
   employing the security credentials via the group identifier for a communication from a member of the group to at least one other member of the group;
   wherein:
   identifying the plurality of potential recipients as members of the group, the group denoted by the group identifier (ID) comprises identifying, by a data communications device, the plurality of potential recipients as members of the group by a virtual private network group identifier (VPN ID), the VPN ID associated with a group prefix indicative of an address subrange denoting group members;
   receiving security credentials for the group corresponding to the group identifier comprises receiving from a key management server by the data communications device a group key for the group associated with the VPN ID;
   associating the received security credentials with the group identifier indicative of potential recipients in the group comprises associating, by the data communications device, the group key with the VPN ID associated with the group prefix indicative of the address subrange denoting group members; and
   employing the security credentials via the group identifier for the communication from a member of the group to at least one other member of the group comprises:
      identifying, by the data communications device, a transmission as having a prefix indicative of an address subrange denoting group members, and
      employing, by the data communications device, the group key to one of encrypt or decrypt the transmission when the transmission has a prefix indicative of an address subrange denoting group members.

2. The method of claim 1 wherein the receiving security credentials further comprises:
   establishing, at a key management server, a group key for the group associated with the group ID; and
   transmitting the resulting security credentials including the group key to data communications devices.

3. The method of claim 2 wherein the security credentials further comprise an announcement, the announcement operable for receipt by the data communications devices and including at least one of:
   the group ID indicative of the members of the group;
   an address of a key server having the group key; and
   an authentication method to be employed with respect to the key for distributing the key to the data communications devices.

4. The method of claim 3 wherein employing the security credentials further comprises:
   communicating with the key management server identified in the multicast announcement;
   authenticating with the key management server and the group ID; and
   receiving the key corresponding to the group ID.

5. The method of claim 1 further comprising:
   identifying a subset of the group denoted by a group prefix indicative of an address subrange denoting group members;
   propagating the group prefix and the group ID to other group members corresponding to other group prefixes indicative of an address subrange denoting group members;
   identifying a communication as destined for another group member; and
   employing the key corresponding to the group for the communication to the other group member.

6. The method of claim 5 further comprising:
   identifying a transmission destined for a recipient subrange corresponding to a particular group;
   retrieving security credentials associated with the particular group; and
   employing the retrieved security credentials for the identified transmission with group.

7. The method of claim 6 wherein the key corresponding to the group security credentials is operable to transform a packet by delivering an encrypted payload representing the packet to a plurality of group members via the key.

8. The method of claim 6 wherein the group is a logical group operable to include group members according to an external protocol, wherein communication between group members further employs consistent routing information between group members.

9. The method of claim 8 wherein the received security credentials are operable to enable data communication devices to receive the same group key avoiding reestablishment of a trusted connection for successive communications between different data communication devices.

10. The method of claim 1 wherein the group further comprises a plurality of address subranges, each address subrange indicative of at least one recipient.

11. The method of claim 10 wherein the communication is from a group member to a plurality of group members employing the same security credentials and avoiding establishing a point to point key from the group member to each of the plurality of group members.

12. The method of claim 11 wherein the communication employs a tunnel mode with header preservation to enable routing information to remain visible in a manner nonintrusive to the encrypted payload.

13. The method of claim 12 wherein communications further allows authentication assurances by comparison of inner and outer header upon delivery.

14. A data communications device for establishing secure group communications comprising:
   a processor coupled to a memory and operable to identify a plurality of potential recipients as members of a group, the group denoted by a group identifier;
   an interface coupled to the processor and operable to receive security credentials for the group corresponding to the group identifier; and
   a routing table in the memory, the routing table responsive to the processor, and operable to associate the received security credentials with the group identifier indicative of potential recipients in the group, the processor operable to employ the security credentials via the group identifier for a communication from a member of the group to at least one other member of the group;

wherein:

the processor coupled to a memory is operable, when identifying the plurality of potential recipients as members of the group, the group denoted by the group identifier, to identify the plurality of potential recipients as members of the group, the group denoted by a virtual private network group identifier (VPN ID), the VPN ID associated with a group prefix indicative of an address subrange denoting group members;

the interface coupled to the processor is operable, when receiving security credentials for the group corresponding to the group identifier to receive a group key for the group associated with the VPN ID;

the routing table in the memory, the routing table responsive to the processor, is operable when associating the received security credentials with the group identifier indicative of potential recipients in the group to associate the group key with the VPN ID associated with the group prefix indicative of the address subrange denoting group members; and the processor operable, when employing the security credentials via the group identifier for the communication from a member of the group to at least one other member of the group, to:

identify a transmission as having a prefix indicative of an address subrange denoting group members, and employ the group key to one of encrypt or decrypt the transmission when the transmission has a prefix indicative of an address subrange denoting group members.

15. The data processing device of claim 14 wherein the processor is further operable to:

establish, via the received security credentials, a group key at a key management server for the group associated with the group identifier; and transmit the resulting security credentials indicative of the group key to the data communications device.

16. The data processing device of claim 15 wherein the security credentials further comprise a routing prefix announcement, the routing prefix announcement operable for receipt by data communication devices and including at least one of:

the group ID indicative of the members of the group;

the address of the key management server having the group key; and an authentication method to be employed with respect to the key.

17. The data processing device of claim 16 wherein the device is further operable to employ the security credentials to:

communicate with the key management server identified in the announcement;

authenticate with the key management server and the group ID; and receive the group key corresponding to the group ID.

18. The data processing device of claim 14 wherein the device is a routing device further operable to:

identify a subset of the group denoted by a group prefix indicative of an address subrange denoting group members;

propagate the group prefix and the group ID to other group members corresponding to other group prefixes indicative of an address subrange denoting group members;

identify a communication as destined for another group member; and employ the key corresponding to the group for the communication to the other group member.

19. The data processing device of claim 18 wherein the device is further operable to:

identify a transmission destined for a recipient subrange corresponding to a particular group;

retrieve security credentials associated with the particular group; and employ the retrieved security credentials for the identified transmission with the recipient group.

20. The data processing device of claim 19 wherein the key corresponding to the group security credentials is operable to transform a packet by delivering encrypted payload representing that packet to a plurality of group members via the key.

21. The data processing device of claim 19 wherein the group is a logical group operable to include group members according to an external protocol, wherein communication between group members further employs consistent routing information between group members.

22. The data processing device of claim 19 wherein the retrieved security credentials are operable to enable data communications devices to receive the same group key to avoid reestablishment of a trusted connection for successive communications between different data communications devices.

23. The data processing device of claim 14 wherein the group further comprises a plurality of address subranges, each address subrange indicative of at least one recipient.

24. The data processing device of claim 23 wherein the communication is from a group member to a plurality of group members employing the same security credentials and avoids establishing a point to point key from the group member to each of the plurality of group members.

25. The data processing device of claim 24 wherein the communication employs a tunnel mode with header preservation to enable routing information to remain visible in a manner nonintrusive to the encrypted payload.

26. The data processing device of claim 25 wherein communications further allows authentication assurances by comparison of inner and outer header upon delivery.

27. A computer program product having a computer readable medium operable to store computer program logic embodied in computer program code encoded thereon for secure communications within a group comprising:

computer program code for identifying a plurality of potential recipients as members of a group, the group denoted by a group identifier;

computer program code for receiving security credentials for the group corresponding to the group identifier;

computer program code for associating the received security credentials with the group identifier indicative of potential recipients in the group; and computer program code for employing the security credentials via the group identifier for a communication from a member of the group to at least one other member of the group;

wherein:

computer program code for identifying a plurality of potential recipients as members of a group, the group denoted by a group identifier comprises computer program code for identifying the plurality of potential recipients as members of the group, the group denoted by a virtual private network group identifier (VPN ID), the VPN ID associated with a group prefix indicative of an address subrange denoting group members;

computer program code for receiving security credentials for the group corresponding to the group identifier comprises computer program code for receiving a group key for the group associated with the VPN ID;

computer program code for associating the received security credentials with the group identifier indicative of potential recipients in the group comprises computer program code for associating the group key with the VPN ID associated with the group prefix indicative of the address subrange denoting group members; and computer program code for employing the security credentials via the group identifier for a communication from a member of the group to at least one other member of the group comprises:

computer program code for identifying a transmission—as having a prefix indicative of an address subrange denoting group members, and computer program code for employing the group key to one of encrypt or decrypt the transmission when the transmission has a prefix indicative of an address subrange denoting group members.

28. A data communications device for establishing secure group communications comprising:

means for identifying a plurality of potential recipients as members of a group, the group denoted by a group identifier;

means for receiving security credentials for the group corresponding to the group identifier;

means for associating the received security credentials with the group identifier indicative of potential recipients in the group; and means for employing the security credentials via the group identifier for a communication from a member of the group to at least one other member of the group;

wherein:

means for identifying the plurality of potential recipients as members of the group, the group denoted by the group identifier comprises means for identifying the plurality of potential recipients as members of the group, the group denoted by a virtual private network group identifier (VPN ID), the VPN ID associated with a group prefix indicative of an address subrange denoting group members;

means for receiving security credentials for the group corresponding to the group identifier comprises means for receiving a group key for the group associated with the VPN ID;

means for associating the received security credentials with the group identifier indicative of potential recipients in the group comprises means for associating the group key with the VPN ID associated with the group prefix indicative of the address subrange denoting group members; and means for employing the security credentials via the group identifier for the communication from a member of the group to at least one other member of the group comprises:

means identifying a transmission as having a prefix indicative of an address subrange denoting group members, and means for employing the group key to one of encrypt or decrypt the transmission when the transmission has a prefix indicative of an address subrange denoting group members.

29. The method of claim 1, wherein the data communication device comprises a gateway router and wherein the plurality of potential recipients comprises client devices.

30. The data communication device of claim 14, wherein the data communication device comprises a gateway router.

* * * * *